United States Patent [19]

Broderick et al.

[11] Patent Number: 4,681,908
[45] Date of Patent: * Jul. 21, 1987

[54] HARD ORGANOPOLYSILOXANE RELEASE COATING

[75] Inventors: Dennis W. Broderick, Rhodes; Harold L. Vincent, Midland, both of Mich.

[73] Assignee: Dow Corning Corporation, Midland, Mich.

[*] Notice: The portion of the term of this patent subsequent to Apr. 29, 2003 has been disclaimed.

[21] Appl. No.: 793,411

[22] Filed: Oct. 31, 1985

Related U.S. Application Data

[63] Continuation-in-part of Ser. No. 550,168, Nov. 9, 1983, Pat. No. 4,585,705.

[51] Int. Cl.$^4$ .............. C08K 5/54; C08G 77/16
[52] U.S. Cl. .................. 524/268; 524/267; 524/860; 525/477; 528/17; 528/33

[58] Field of Search .......... 528/17, 33; 525/477; 524/860, 268, 773, 267

[56] References Cited

U.S. PATENT DOCUMENTS

| | | | |
|---|---|---|---|
| 3,308,079 | 3/1967 | Haenni | 428/447 |
| 3,308,080 | 3/1967 | Haenni | 428/447 |
| 3,419,514 | 12/1968 | Hadlock | 528/29 |
| 3,925,276 | 12/1975 | Merrill | 528/43 |
| 4,204,021 | 5/1980 | Becker | 428/325 |

Primary Examiner—Joseph L. Schofer
Assistant Examiner—F. M. Teskin
Attorney, Agent, or Firm—Robert L. McKellar

[57] ABSTRACT

What is disclosed are organopolysiloxane release coatings which are curable on a substrate and which consist of a base siloxane copolymer containing $CH_3SiO_{3/2}$ units; $C_6H_5SiO_{3/2}$ units, $C_6H_5(CH_3)SiO$ units and $(C_6H_5)_2SiO$ units; $CH_3SiO_{3/2}$; a fluid polysiloxane, and a curing agent. They are especially useful on commercial and household cookware and bakeware.

8 Claims, No Drawings

HARD ORGANOPOLYSILOXANE RELEASE COATING

This is a continuation-in-part of application Ser. No. 06/550,168, filed Nov. 9, 1983, now U.S. Pat. No. 4,585,705.

BACKGROUND OF THE INVENTION

This invention deals with hard, curable, clear and pigmented release coatings for cookware and bakeware. For years, it was a common method in the commercial baking art to utilize natural fats, greases and vegetable oils for coating cookware to obtain release of the cooked goods from the cookware, but in the early part of the decade beginning with 1960, the commercial cooking industry, especially the baking industry, was introduced to polyorganosiloxanes as a means of obtaining release of foods and baked goods from the cookware. Originally, the application of such organopolysiloxane release materials consisted of substituting the fluid organopolysiloxanes for the natural release agents in anticipation that the organopolysiloxanes would be more durable in use and thus require less down time in order to treat the cookware units.

The release coating technology moved quickly as various curable, thus more durable, organopolysiloxanes were introduced to the industry. These more advanced release coatings usually consisted of hydroxy-containing fluids, which were usually linear polydimethylsiloxanes, dissolved in higher viscosity phenylmethylpolysiloxanes or, such linear materials were combined with solvent-based or solventless organopolysiloxane resins and cured onto certain substrates, by the application of heat, to cause condensation reactions. Other, more modern, release coatings utilizing siloxanes involved the combination of a linear, hydroxylated, diorganopolysiloxane, a phenylmethylpolysiloxane and an organopolysiloxane block copolymer which is heat cured unto the substrate. Such a coating is described in U.S. Pat. No. 3,308,079, issued Mar. 7, 1967 and cures through condensation reactions of the silanols present in the siloxane components.

A similar release coating material is described in U.S. Pat. No. 3,308,080, issued Mar. 7, 1967, except that the phenylmethylpolysiloxane does not form part of the composition.

In U.S. Pat. No. 3,925,276, issued on Dec. 9, 1975, there is described a process for preparing a silanol-containing organopolysiloxane resin which is useful as a release resin. This type of resin is described as giving good release to sugar-containing baked goods. This type of resin, with a fairly specific ratio of alkyl and aryl siloxanes, cures by heat curing through condensation reactions.

U.S. Pat. No. 4,204,021 deals with a composite layer concept for release purposes wherein a first coating is applied to a porous ceramic layer and impregnates the porous ceramic layer. The top layer is a release layer and the patent describes organopolysiloxanes as part of a group of known release coatings wherein there is present in the organopolysiloxane, an unsaturated radical on silicon, which when combined with a photosensitizer, can be cured by exposure to a free radical light source.

British Patent No. 1,448,985, issued Sept. 8, 1976, describes pigmented release coatings that are obtained by a two coat composite method, in which, the bottom coat is a cured pigmented coating and the top coat is a hard, transparent release coating. The hard, transparent release coating is generally described as a silicone resin that gives release. No additional information is given about the release coating which would enable one to ascertain its composition or cure mechanisms.

Finally, there is disclosed in U.S. Pat. No. 3,419,514, issued Dec. 31, 1968, an "air-dried" version of an organopolysiloxane-based release coating. The coating contains a phenylmethylpolysiloxane having a hydroxyl content of at least 3 percent by weight, a phenyl to silicon ratio of at least 0.3 and a total phenyl and methyl to silicon ratio of from 1.2 to 1.7; RO(R'CHCH$_2$O)$_2$H; methylpolysiloxane fluid having at least 2% by weight of silicon-bonded hydroxyl groups and

These materials cure at room temperature in a very short period of time by reaction of the acetoxysilane with moisture in the air and subsequent condensation reactions under the influence of catalysts.

Since the instant invention can be described in-part as an "air-dried" release coating, the '514 reference is, in the applicants' opinion, the closest prior art. None of the other references are considered by the applicants to anticipate or make obvious the instant invention and further, and even though the '514 patent is considered pertinent prior art, it differs from the instant invention in at least the following manner: most importantly, the crosslinking means of the instant invention consists of the inclusion of CH$_3$Si(OCH$_3$)$_3$ in the composition. This alkoxy silane, upon hydrolysis, liberates non-corrosive methanol which is removed quickly during the cure reaction whereas the crosslinking means of the '514 reference liberates acetic acid during the cure reaction. This acetic acid is both corrosive to metal substrates and is extremely difficult to remove during the cure reaction.

Further, the essential base siloxane of the '514 reference is a phenylmethylpolysiloxane whereas the essential base siloxane of the instant invention is a copolymer of four specific alkyl and/or aryl-containing siloxane units. Component (c) of the reference material is similar in composition to component (C) of the instant invention but the instant composition does not contain the organic polyether, component (b) of the '514 reference. Therefore, even though the two inventions have a common ingredient, i.e., component (c) in each case, and even though they both claim to have air-dry properties, it is quite obvious that the comparison stops there and the material of the instant invention is not the same as the material of the '514 reference.

THE INVENTION

The instant invention deals with curable organopolysiloxane release coatings.

In one aspect, this invention deals with clear, curable organopolysiloxane release coatings and in another aspect, this invention deals with pigmentable, curable organopolysiloxane release coatings.

In yet another aspect of this invention, this invention deals with solid substrates coated with the release coatings of this invention and still further, this invention deals with articles which are coated with the release coatings of this invention.

Finally, this invention contemplates a method of enhancing release from the surface of a solid substrate.

More specifically, this invention deals with a composition of matter comprising (A) 100 parts by weight of a hydroxyfunctional polysiloxane resin copolymer containing $CH_3SiO_{3/2}$ units, $C_6H_5SiO_{3/2}$ units, $(C_6H_5)_2SiO$ units and $C_6H_5(CH_3)SiO$ units wherein there is present 0.5 to 5 weight percent hydroxy radicals attached to silicon atoms, the organic group to silicon ratio is 0.8 to 1.4 and the $C_6H_5-$ to silicon ratio is from 0.35 to 0.85; (B) from 4 to 240 parts by weight, based on 100 parts of (A), of $CH_3SiO_{3/2}$ and (C) from 0.2 to 6 parts by weight, based on 100 parts of (A), of a fluid polysiloxane having the formula $(RR'R''Si)_2O[(CH_3)_2SiO]_x$, wherein x has a value of from 250 to 850, R is OH or $CH_3-$ and R' and R'' are $CH_3-$, wherein there is present in component (C), less than fifteen percent by weight of $(CH_3)_3SiO$ units.

The first component of this invention, component (A), the base siloxane is a hydroxy-functional polysiloxane resin copolymer containing $CH_3SiO_{3/2}$ units, $C_6H_5SiO_{3/2}$ units, $C_6H_5(CH_3)SiO$ units and $(C_6H_5)_2SiO$ units. It should be noted that this base siloxane contains no $(CH_3)_2SiO$ units and further, this base siloxane must have from about 0.5 to 5 weight percent of hydroxy radicals which are attached to silicon atoms. Further, this base siloxane resin has an organic group to silicon ratio of from 0.8 to 1.4 and a $C_6H_5-$ to silicon ratio of from 0.35 to 0.85.

This copolymer can be prepared by known commercial means such as, for example, by the hydrolysis and condensation of chloro- or alkoxy silanes. These base siloxanes are commercially available and elaboration on the details of their preparation is believed to be unnecessary herein. It should be noted that upon condensation of the hydrolyzate, and subsequent catalytic bodying using techniques known in the art, this base siloxane can be obtained essentially solvent-free and it is preferred for this invention that the base siloxane be utilized to form the composition of this invention in such a form. This allows the solids content of the final composition to be varied such that handling properties, economy in shipping the formulations and, the thickness of coatings on the substrates can be widely varied. If it is required that the base siloxane be used in solvent, the base siloxane can be easily dissolved in common organic solvents such as xylene, toluene, naphtha and the like. This component is generally used at 100 parts by weight in the composition.

Component (B) of this invention, $CH_3SiO_{3/2}$, is a residual product derived from the alkoxysilane, $CH_3Si(OCH_3)_3$. The alkoxysilane is added to the formula neat, as it is a low viscosity fluid material which helps solubilize some of the higher molecular weight components and helps the total composition to become homogeneous upon initial mixing. It is believed by the inventors herein that the alkoxy silane, when under the influence of a curing agent, initially reacts with the hydroxyl groups of the base siloxane and the hydroxyl groups of the slip agent, component (C) (to be described infra), to form low molecular weight alkoxy-functional siloxanes which eventually react further to liberate methanol and form silanol groups which eventually condense to form high molecular weight materials and crosslinking sites which cure the composition. Component (B) is a common product of commerce and is readily available and therefore, no additional details on preparation are required herein. For purposes of this invention, there is generally used from 4 to 240 parts by weight of component (B), for every 100 parts of component (A). It is preferred, however to use from 50 to 150 parts by weight of component (B) and it is most preferred to use 80 to 120 parts of component (B).

Component (C) of this invention, the fluid polysiloxane, has the general formula $(RR'R''Si)_2O[(CH_3)_2SiO]_x$ wherein x has a value of from 250 to 850, R is an OH or $CH_3-$ radical and R' and R'' are $CH_3-$ radicals, wherein there is present in component (C), less than fifteen percent by weight of $(CH_3)_3SiO$ units.

This component is the "slip" component of the composition, that is, this component is the ingredient in the formulation that is primarily responsible for the release characteristics of the cured coating. Component (C) is readily manufactured by well-known means by those skilled in the art and elaboration on such means is deemed unnecessary herein.

For purposes of this invention, the fluid polysiloxanes (fluid siloxanes) useful in this invention are those having hydroxy endblocking, for example $HO(CH_3)_2SiO[(CH_3)_2SiO]_xSi(CH_3)_2OH$ combined with those siloxanes having partial substitution of the hydroxyl groups with $(CH_3)_3SiO$ units. Because of the nature of the method used to prepare such materials, it is also within the scope of this invention to include small amounts of fully endblocked polysiloxanes, for example, $[(CH_3)_3Si]_2O[(CH_3)_2SiO]_x$. For purposes of this invention, "small amounts" means less than about 10 weight percent, based on the total weight of component (C) in the inventive composition. The value of x serves to indicate the approximate viscosity of the fluid siloxanes. Thus, preferred for this invention are fluid siloxanes having a viscosity of from 8,000 to 20,000 cps. Mostly preferred for this invention are fluid siloxanes having a viscosity of from 11,000 to 14,000 cps.

Component (C) is used in this invention at 0.2 to 6 parts by weight, based on 100 parts of component (A). Most preferred is the use of the component (C) at 0.5 to 2 parts per 100 parts of component (A). This component is generally utilized at 10 weight percent solids in a solvent such as toluene.

A silanol condensation catalyst can be used to cure the composition of this invention. Preferred are titanate catalysts as they tend to promote the efficient reaction of the alkoxy-silanes with the silanols of components (A) and (C) and, the titanates also tend to promote the condensation reaction between the silanols. Especially preferred are the titanate esters, tetraisopropyltitanate and tetrabutyltitanate. These catalysts are used neat, that is, they are generally used without solvent since they appear to be highly compatible with the components (A), (B) and (C). The titanate curing agents are commercially available.

Optionally, solvents can be used with the inventive composition or the composition can be used at 100% solids. It is preferred that the compositions be used in a solvent solution for ease of handling, flow out properties and film thickness control. Generally, the compositions are present in the solvent at about 20 to 70 weight percent non-volatile materials. Preferred for this invention are the common organic solvents. Especially preferred are xylene, toluene, isobutylisobutyrate, naphtha and the like. Most especially preferred are toluene solutions containing about 40 weight percent non-volatiles.

The method of preparation of the inventive compositions is not narrowly critical. The three components (A), (B) and (C) are mixed together and homogenized by stirring or shaking. When first mixed, the mixture is opaque to translucent in appearance but within a few minutes, the mixture starts to clear and within a short time, for example, 2 hours, the mixture is quite clear. It is ready for use as a coating at that time or the mixture can be stored at room temperature for several months. Sometimes, the three components are thoroughly mixed until transparent and the curing agent is added just before use if desired. This method allows for enhanced shelf stability of the three component composition. The solvent, if used, can be added at any point in the preparation. If solvent is to be used, it is preferably added at the beginning of the preparation in order to facilitate the preparation.

Components (A) through (C) are the essential ingredients of this invention but it is contemplated herein that aside from the use of solvents, there can also be included such optional ingredients such as pigments, metal flakes and powders, stabilizers, colorants, flow and film forming agents and the like.

In use, the coating can be applied by any conventional coating technique such as spraying, dipping, brushing or by the use of a doctor blade. For this invention, spraying and dipping are preferred. Most preferred is a dipping technique, as spray coating tends to lead to somewhat softer cured coatings.

The compositions of this invention can be applied to most surfaces without the use of a primer. For some applications, however, it may be desirable to use a primer. These coatings can be applied to most solid substrates but it is preferred for purposes of this invention, to coat metal substrates, especially metal bakeware and cookware such as steel, copper, aluminum, tin, magnesium and alloys of such metals. As far as is known by the inventors, these coatings can be used for almost any type of food such as baked goods, fried and broiled meats, vegetables, sauces and gravies.

These compositions, when in the fluid form, are characterized by ease of preparations, shelf stability, handling characteristics and both room temperature and elevated heat curability. When coated and cured on a substrate, these cured coatings impart highly desirable release characteristics, they are hard coatings, they adhere to the substrate without the use of primers and they exhibit hot oil and hot and warm soap resistance so that clean-up of the coated articles is minimal.

These materials are useful in the home but they find greater use in commercial cooking and baking applications.

Now, so that those skilled in the art more clearly understand the invention, the following examples are presented and these examples should not be construed as narrowly limiting the invention as set forth in the claims and the specification.

For purposes of these examples, the following applies.

The metal panels used in these tests were purchased from the Q-Panel Company, Cleveland, Ohio, U.S.A.

Room temperature cures were at ambient conditions of 25° C.

The slip material used in these formulations is a 10 weight percent solvent solution of a hydroxy endblocked polydimethylsiloxane of approximately 12,000 cps which contains less than 15 percent by weight of trimethylsiloxy endblocking.

Special Naphtholite (naptha) is a solvent manufactured by Union 76, Amsco Division, Union Oil of California, Palative, Ill., 60067.

The following test procedures were used to evaluate the resin coatings.

(a) Pencil Hardness

A pencil lead of known hardness (4B-softest to 9H-hardest) is sanded flat on the end. The end is then held on a 45° angle on the coating and pressed into the coating. Pencils of increasing hardness are used until the resin film is gouged. The pencil hardness recorded is that pencil number just prior to the one which breaks through the film. >9H means the hardest pencil did not break through the coating. (4B, 3B, 2B, B, H, 2H, 3H, 4H, 5H, 6H, 7H, 8H, 9H).

(b) Slip Angle

A weight which is a cylindrical weight of approximately 3 oz. is wrapped with 8 layers of cheesecloth and placed atop a panel that has been coated with the resin and cured. The panel is then inclined until the weight begins to slide. The angle of initial slipping is the slip angle. This indicates the release properties of the cured resin film.

(c) Steam Stability

The coated panels are placed over a glass beaker of boiling deionized water for 15 minutes. Any whitening or adhesion loss is noted as failure.

(d) Wetting

Wetting is a visual observation of the film for defects such as cratering or rivulets of resin.

(e) Salt Spray

The coated panels are placed in a salt fog chamber for 100 hours, then observed for corrosion of the metal or adhesion loss of the resin.

(f) MiBK Rub Test

This test is used to test the degree of cure and integrity of the cured coating. The test is carried out by wrapping the peen end of a ballpeen hammer with 10 layers of cheesecloth and saturating the cheesecloth with methyl isobutyl ketone (MiBK). The hammer, with the cheesecloth contacting the coating, is rubbed across the coating, using only the weight of the hammerhead, until the resin coating is broken through to the bare metal. The number of back and forth rubs is recorded as the number of "double rubs" required to just break through the coating.

(g) Crosshatch Adhesion

This test is carried out by coating a metal substrate, curing the coating, and scratching through the coating with a sharp instrument to form a grid of 10 squares on each side of the grid. Scotch ® brand (3M Company, Minneapolis, Minn., U.S.A) adhesive tape about 1" wide is pressed sticky side down over the crosshatch with normal pressure. The tape is then sharply removed by pulling the tape away from the surface in a direction parallel to the surface. The number of small squares remaining on the surface is reported as the % adhesion. An average of these pulls is recorded. For purposes of this invention, "good" means greater than 90% of the squares remained after the tape pull.

EXAMPLE 1

This sample was prepared by adding and mixing the ingredients in a pint glass bottle on a revolving wheel until the mixture was homogeneous. The mixture consisted of 80 gms (100 parts by weight) of a hydroxyfunctional polysiloxane resin having about five weight percent hydroxyl groups on silicon and consisting of $CH_3SiO_{3/2}$ units, $C_6H_5SiO_{3/2}$ units, $(C_6H_5)_2SiO$ units and $C_6H_5(CH_3)SiO$ units and having an organic group to silicon ratio of approximately 1.2 and a $C_6H_5/Si$ ratio of 0.6; 120 gms (150 parts by weight) of NS 66/3 Special naphtholite (VM & P naphtha of low aromatic content); 40 gms (50 parts by weight) of Dowanol® EB (ethylene glycol mono butylether), manufactured by the Dow Chemical Company, Midland, Mich., U.S.A.; 40 gms (50 parts by weight) of dry toluene and 1.64 gms (2.05 parts by weight) of a fluid polysiloxane as described above.

When eighty gms of the above mixture (100 parts resin) was treated with $CH_3Si(OCH_3)_3$ and tetraisopropyltitanate (tipt) according to the formulations in Table I and cured, the properties shown on Table I were obtained. There was used 0.24 gms of tipt (0.75 parts) for each sample and the substrate was R-39 cold rolled steel purchased from the Q-Panel Co.

TABLE I

| | Formulations and Results | | | |
|---|---|---|---|---|
| Sample | $CH_3Si(OCH_3)_3/$ gms | $CH_3SiO_{3/2}/$ parts | Cure Time-Min./ Temp.-°F. | Pencil Hardness |
| 1A | 2.70 | 4.12 | 15 | 400 | 9H |
| 1B | 2.70 | 4.12 | 60 | 400 | 8H |
| 1C | 3.69 | 5.53 | 15 | 400 | >9H |
| 1D | 3.69 | 5.53 | 60 | 400 | 9H |
| 1E | 4.50 | 6.92 | 15 | 400 | >9H |
| 1F | 4.50 | 6.92 | 60 | 400 | >9H |

EXAMPLE 2

Several larger preparations of the compositions of Example 1 were prepared in essentially the same manner as in Example 1. Combined were 50 gms of the resin (100 parts), as described in Example 1, 88 gms (176 parts) of toluene, 56.6 gms (113.2 parts) of $CH_3Si(OCH_3)_3$, 1.6 gms (3.2 parts) of the fluid polysiloxane as in Example 1 and 1.6 gms (3.2 parts) of tetraisopropyltitanate. These materials were revolved until homogeneous. This material was designated 2A. Sample 2B was the same except that 85 gms (170 parts) of $CH_3Si(OCH_3)_3$ and 1.9 gms (3.8 parts) each of tipt and fluid siloxane were added and 2C was the same as 2A except that 113.3 gms (226.4 parts) of $CH_3Si(OCH_3)_3$ and 2.1 gms (4.2 parts) each of tipt and fluid siloxane were added. The formulations can be found on Table II. The substrate was R-39 cold rolled steel panels purchased from the Q-Panel Company.

weight percent hydroxyl groups and consisting of $CH_3SiO_{3/2}$ units, $C_6H_5SiO_{3/2}$ units, $(C_6H_5)_2SiO$ units and $C_6H_5(CH_3)SiO$ units and having an organic group to silicon ratio of approximately 1.2 and a $C_6H_5/Si$ ratio of approximately 0.6; 50.6 gms of toluene; 96.8 gms of isobutylisobutyrate; 166.8 gms of Special naphtholite 66/3 solvent; 6.4 gms of a slip material as described above and 325.9 gms of $CH_3Si(OCH_3)_3$. This mixture when cured will provide a $CH_3SiO_{3/2}$ to resin ratio of 102/100. To this mixture was added 3.2 parts by weight of tetraisopropyl titanate as a curing agent. Into the mixture was then dipped two, 3"×9" aluminized steel panels and when removed, they were allowed to air dry for about 15 minutes. The coatings were then cured, one in an air circulating oven at 600° F. for 6 minutes and the other at room temperature for two hours. The oven cured panel was designated 3A and had a pencil hardness greater than 9H and a methyl ethyl ketone (MEK) rub of 35 double strokes while the room temperature cured coating designated 3B had a pencil hardness of greater than 9H and the MEK rub was 8 double strokes. The 3A coating passed the steam stability test.

EXAMPLE 4

When the coating prepared in Example 3 above was cured 6 minutes @ 600° F. without the addition of catalyst, the pencil hardness was greater than 9H but the coating failed to pass the steam stability test.

EXAMPLE 5

When the coating prepared in Example 3 above was cured 6 minutes at 600° F. using p-toluenesulfonic acid instead of tetraisopropyltitanate, at the same level, as a curing agent, the coating did not cure.

EXAMPLE 6

Effect of the amount of catalyst

A mixture was prepared by adding to a pint jar 100 gms of the polysiloxane resin described in Example 1; 100 gms of $CH_3Si(OCH_3)_3$; 135 gms of the solvents described in Example 1 (at the same ratios); and 2.68 gms of slip material. The mixture was capped and revolved on the wheel until homogeneous and then aliquots of the mixture were taken and treated with varying amounts of tetraisopropyltitanate catalyst according to Table III.

TABLE III

| | Varying the Level of Catalyst Concentration | | | |
|---|---|---|---|---|
| Sample | Resin/Gms (parts) | $CH_3Si(OCH_3)_3/$ gms (parts) | Cat./gms (parts) | Fluid Siloxanes/ gms (parts) |
| 6A | 100 (100) | 203 (100) | 4 (4) | 0.2 (0.2) |
| 6B | 100 (100) | 203 (100) | 6 (6) | 0.2 (0.2) |
| 6C | 100 (100) | 203 (100) | 8 (8) | 0.2 (0.2) |

TABLE II

| | Formulations of Example 2 | | | | | | | | |
|---|---|---|---|---|---|---|---|---|---|
| Sample | Resin gms/parts | $CH_3Si-$ $(OCH_3)_3$ gms | $CH_3-$ $SiO_{3/2}$ gms | $CH_3-$ $SiO_{3/2}$ parts | Fluid Siloxane gms | Fluid Siloxane parts | Tetraisopropyl titanate gms | P.H.* | Slip Angle | Crosshatch Adhesion |
| 2A | 50/100 | 56.6 | 27.9 | 55.8 | 1.6 | 3.2 | 1.6 | 7H | — | 100% |
| 2B | 50/100 | 85.0 | 41.9 | 83.8 | 1.9 | 3.8 | 1.9 | 7H | — | 100% |
| 2C | 50/100 | 113.3 | 55.8 | 111.6 | 2.1 | 4.2 | 2.1 | 9H | 3° | 100% |

*Pencil Hardness

EXAMPLE 3

This sample was prepared by adding and mixing the ingredients in a pint glass jar on a revolving wheel until the mixture was homogeneous. To the jar was added 160 gms of a polysiloxane resin having about five The mixtures were coated on aluminized steel panels and cured at 600° F. for 6 minutes. The results are in Table IV.

TABLE IV

Results of Testing, Example 6

| Sample | Pencil Hardness | Steam Stability |
|---|---|---|
| 6A | >9H | pass |
| 6B | 6H | pass |
| 6C | 7H | pass |

EXAMPLE 7

The inventive coating as a release coating

A large batch of the inventive resin was prepared (300 lbs.) in which the ratio of $CH_3SiO_{3/2}$ to resin was 1:1. Then the slip material was added to aliquots of the resin at 0.8 parts based on 100 parts of the resin and the catalyst was added to the aliquots after the aliquots were taken from the large batch and diluted to 40% solids in solvent consisting of toluene, Special naphtholite and isobutylisobutyrate at a weight ratio of 17.5: 49.5: 33. The resins, after catalysis were used to dip coat two separate aluminized 3"×9" steel panels. After dipping, the coatings were allowed to air dry for about 15 minutes. The coated panels were then cured at 600° F. for 6 minutes. The formulations with catalysts and the results are shown in Table V.

TABLE V

Release Coatings

| Sample | Catalyst Type | Catalyst Parts | Pencil Hardness | Slip Angle | MiBK Rubs |
|---|---|---|---|---|---|
| 7A | Tetraisopropyl-titanate | 2 | >9H | 6° | 22 |
| 7B | Tetrabutyltitanate | 2 | >9H | 6° | 16 |

These coatings had good crosshatch adhesion, hardness and excellent release.

EXAMPLE 8

Two resin formulations were prepared by essentially the same method as Example 1. The formulations and testing results are shown in Table VI. The substrate was R-39 cold rolled steel.

TABLE VI

Formulations and Results of Example 8

| Sample | Resin/ gms | Toluene/ gms | $CH_3Si(OCH_3)_3$/ gms | Fluid Siloxane/ gms | Tipt/ gms |
|---|---|---|---|---|---|
| 8A | 50 | 88 | 6.3 | 1.1 | 1.1 |
| 8B | 50 | 126.2 | 203.3 | 3.0 | 3.0 |

| Cure Time-Min./ Temp °F. | Slip Angle | Pencil Hardness | Crosshatch Adhesion | Steam Stability |
|---|---|---|---|---|
| 6  600 | 4.5 | 7H | Good | Pass |
| 6  600 | 5.5 | >9H | Good | Pass |

EXAMPLE 9

Effect of cure temperature

A formulation was prepared in which there was present parts of resin of Example 1 and 100 parts of $CH_3SiO_{3/2}$. Sixty gms of this resin was added to 90 gms of solvent as described in Example 7, 0.5 gms of 10 weight percent fluid siloxane and 2.0 gms of tetraisopropyltitanate. The formulation was coated on R-39 cold rolled steel and cured at a given time and various temperatures as shown in Table VII.

TABLE VII

Effects of Cure at Various Temperatures

| Sample | Time | Temperature | Pencil Hardness | MiBK Rubs* |
|---|---|---|---|---|
| 9A | 2 hrs. | 25° C. | >9H | 8 |
| 9B | 5 min. | 150° F. | >9H | 10 |
| 9C | 5 min. | 250° F. | >9H | 10 |
| 9D | 5 min. | 350° F. | >9H | 13 |
| 9E | 6 min. | 600° F. | >9H | 70 |

*Average 3 trials

EXAMPLE 10

The resin formulation prepared in Example 3 was tested after setting on the shelf for thirty days. The material was coated on a R-39 cold rolled steel panel and cured. The results can be found on Table VIII.

TABLE VIII

Shelf Stability of the Formulation of Example 3

| Sample | Cure Time/Temp. | Pencil Hardness | MiBK Rubs | Steam Stability |
|---|---|---|---|---|
| 10A | 2 hrs/25° C. | >9H | 8 | Fail |
| 10B | 6 mins/600° F. | >9H | 35 | Pass |

EXAMPLE 11

Several tin plated steel bakeware units were coated with the resin prepared in Example 3. The bakeware was tested in multiple tests such as pencil hardness, adhesion, hot oil resistance, dishwasher, release, hand dishwashing, cure and broiling resistance, all of which are standard tests. When cured for 6 minutes at 600° F., the following results (Table IX) were observed. In general, the coating was smooth and had good gloss.

TABLE IX

| Sample | Pencil Hardness | Adhesion | 400° F.-1 Hour Hot Oil Resistance | Dishwasher 45 Cycles | Cookie Release Test 28 Cycles |
|---|---|---|---|---|---|
| 11A | 6H | Very Good | No effect | No effect | Good |

| Hand Dishwashing | | Broiled Ham Release |
|---|---|---|
| Joy ® 0.2% @ 110° F. | Cascade ® 0.35% @ 160° F. | |
| No effect | No effect | Good |

Joy is a registered trademark of Proctor and Gamble, Cincinnati, Ohio, U.S.A.
Cascade is a registered trademark of Proctor and Gamble, Cincinnati, Ohio, U.S.A.

EXAMPLE 12

A pigmented, hard curable coating of this invention

An inventive composition similar to that prepared in Example 2 was treated by mixing together 43 gms of toluene, 415 gms of a 50/50 weight blend of the base resin of Example 1 and $CH_3Si(OCH_3)_3$; 45 gms of silica (Syloid 404, manufactured by Grace, Davidson Chemical, Baltimore, Md., U.S.A.); 20 gms of Raven 7000 channel black, manufactured by Cities Services Company and 1.3 gms of the slip used in Example 1.

This formulation was then placed in a one-quart ceramic ball jar along with various sized ceramic balls and ball-milled for about 16 hours on a roller. This treatment resulted in a black pigmented coating resin. This material was designated as 12A. A second material, prepared from the resin composition as used in sample 12A (230.8 gms) was treated with 90 gms of R-900 TiO$_2$, manufactured by DuPont, Wilmington, Del., U.S.A. and 159.2 gms of toluene.

This material was also ball milled for 16 hours to give a white coating. This material was designated 12B. When these materials were coated on aluminum panels, the following results were achieved. (See Table X).

TABLE X

Results from Example 12

| Sample | Color | Cure Time/Temp. | Pencil Hardness | Slip Angle | Steam Stability | MiBK Rubs | Comments |
|---|---|---|---|---|---|---|---|
| 12A | Black | 2 hrs./25° C. | <4B | — | Fail | 1 | Tacky to touch |
| 12A | Black | 6 mins/600° F. | 5H | — | Pass | 3 | Tack free |
| 12B | White | 2 hrs./25° C. | <4B | — | Fail | 1 | Tacky to touch |
| 12B | White | 6 mins/600° F. | 3H | 10 | Pass | 17 | Tack free |

That which is claimed is:

1. A composition of matter comprising
 (A) 100 parts by weight of a hydroxyfunctional polysiloxane resin copolymer containing CH$_3$SiO$_{3/2}$ units, C$_6$H$_5$SiO$_{3/2}$ units, (C$_6$H$_5$)$_2$SiO units and C$_6$H$_5$(CH$_3$)SiO units wherein there is present 0.5 to 5 weight percent hydroxy radicals attached to silicon atoms, the organic group to silicon ratio is from 0.8 to 1.4 and the C$_6$H$_5$— to silicon ratio is from 0.35 to 0.85;
 (B) from 4 to 240 parts by weight, based on 100 parts of (A), of CH$_3$SiO$_{3/2}$; and
 (C) from 0.2 to 6 parts by weight, based on 100 parts of (A), of a fluid polysiloxane having the formula (RR'R"Si)$_2$O[(CH$_3$)$_2$SiO]$_x$, wherein x has a value of from 250 to 850, R is OH or CH$_3$— and R' and R" are CH$_3$—, wherein there is present in component (C), less than fifteen percent by weight of (CH$_3$)$_3$SiO units.

2. A composition of matter as claimed in claim 1 wherein there is present 100 parts by weight of component (A); 80 to 120 parts by weight of component (B) and 0.5 to 2 parts by weight of component (C).

3. A composition of matter as claimed in claim 1 wherein there is present 100 parts by weight of component (A); 90 parts by weight of component (B) and 1 part by weight of component (C).

4. A composition of matter as claimed in claim 1 wherein there is present 100 parts by weight of component (A); 100 parts by weight of component (B) and 2 parts by weight of component (C).

5. A composition as claimed in claim 1 wherein there is also present an organic solvent.

6. A composition as claimed in claim 5 wherein the organic solvent is toluene.

7. A composition as claimed in claim 1 wherein there is also present a mixture of organic solvents.

8. A composition as claimed in claim 7 wherein the solvents are toluene, isobutylisobutyrate and naphtha.

* * * * *